United States Patent Office 2,785,216
Patented Mar. 12, 1957

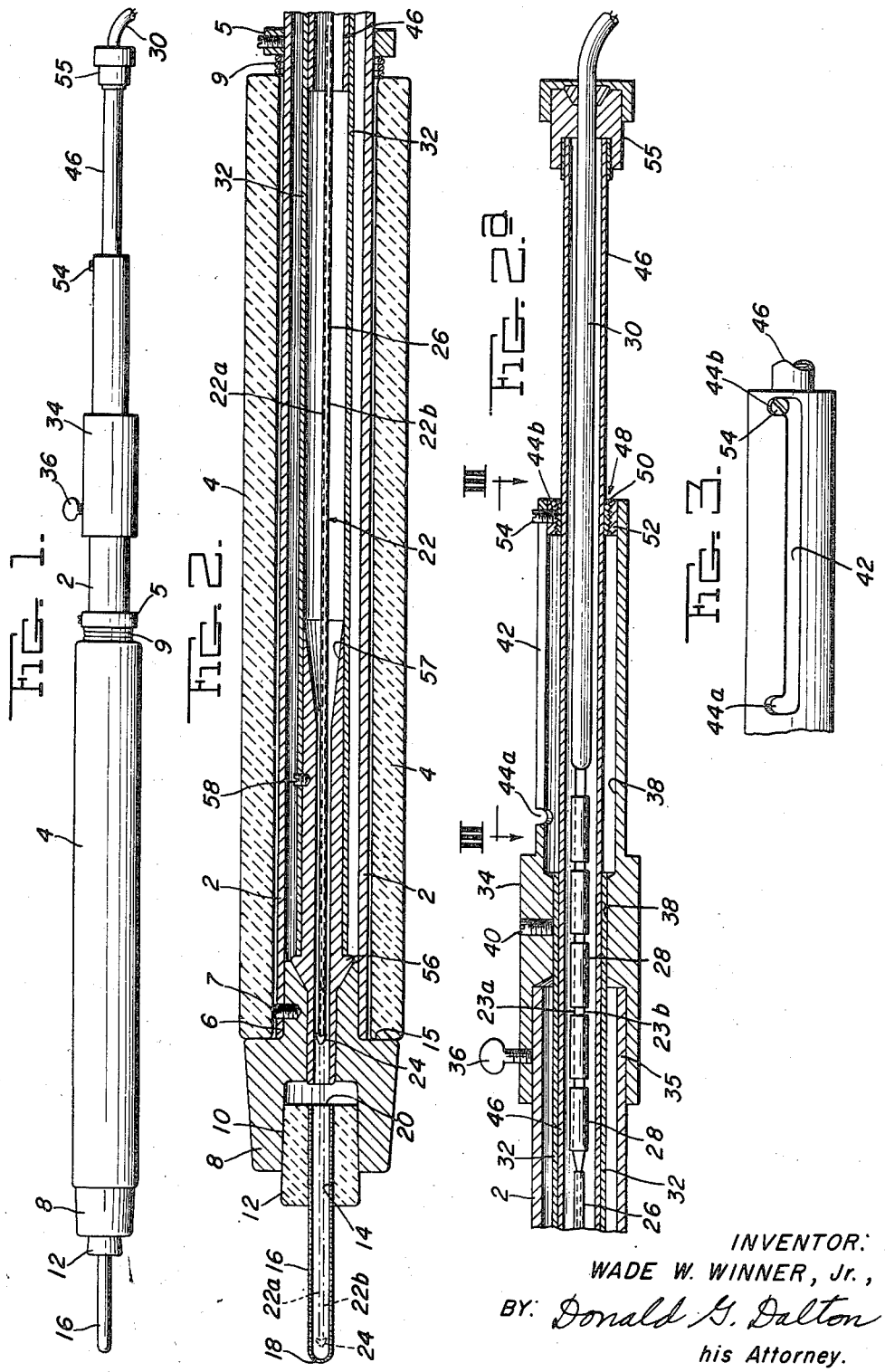

2,785,216

IMMERSION TYPE THERMOCOUPLE

Wade W. Winner, Jr., Ross Township, Allegheny County, Pa., assignor to United States Steel Corporation, a corporation of New Jersey Application October 7, 1954, Serial No. 460,870

4 Claims. (Cl. 136—4)

The present invention relates to thermocouples and more particularly to an immersion type thermocouple having a removable housing and a retractable thermal junction especially suitable for measuring the temperature of a molten metal bath in a melting furnace.

Accurate control of temperatures during the various stages of all steel making processes is essential to the economic production of good quality steel. To this end various temperature measuring devices have been developed for determining temperatures during various steel making processes. The device most widely used for ascertaining the temperature of a molten bath of steel, such as the contents of an open hearth furnace, is the immersion type thermocouple.

Prior to my invention, the conventional thermocouple consisted generally of a thermo-electric wire unit made up of two wires of dissimilar rare metals joined together at one end to form a thermal junction and connected at their other ends to compensating lead wires. When a difference in temperature existed between the thermal junction and the free ends of the two wires, or the extensions thereof, an electrical potential was developed which was proportional to the difference in temperature. This electrical potential was measured at the free ends of the wires or extensions thereof by means of a calibrated electrical potential measuring instrument, such as a voltmeter or galvanometer, to determine the temperature at the thermal junction.

Ordinarily, porcelain insulating sleeves covered the lengths of the wires leading from the thermal junction, and a cover assembly of heat insulating materials encased the wires and insulators to protect them from the intense heat and the corrosive effect of the molten slag and molten metal bath. The non-insulated thermal junction was protected by means of an immersion tip or housing made of quartz or other suitable high melting point material which projected from one end of the cover assembly. The compensating lead wires projected through a cap on the end of the cover assembly remote from the immersion tip in an insulated extension cable to a connection with the measuring instrument.

In use, the thermocouple was inserted into an open hearth furnace through the wicket hole in the furnace door so that the quartz tip, which contained the thermal junction, was immersed in the molten metal bath. Heat from the molten metal passed through the quartz tip to the thermal junction, and a temperature reading was then obtained from the calibrated electrical instrument to which the extension cable was connected.

Several disadvantages were inherent in the structural arrangement of the prior art immersion type thermocouple which seriously affected its use. One of the most pertinent of these was the fact that the thermal junction usually remained in the quartz immersion tip so that any damage to the immersion tip usually resulted in damage to the thermal junction. The immersion tip was frequently damaged by being struck against the sides of the wicket hole as the thermocouple was inserted into or withdrawn from the furnace. Damage to the thermal junction was also caused by the immersion tip striking the mill floor on occasions when the thermocouple was accidentally dropped. Whenever breakage of the immersion tip occurred in any way the thermal junction was exposed to damage.

Part of the cover assembly of the immersion type thermocouple was immersed in molten metal each time a temperature reading was made so that skulls of solidified metal frequently formed on the assembly. This constituted another serious shortcoming in prior art thermocouple since it was necessary to remove the complete thermocouple from service each time a skull had to be removed.

It is, accordingly, an object of my invention to eliminate or minimize the foregoing disadvantages by providing a thermocouple made up of a cover assembly and thermo-electric circuit which are independent and interchangeable.

It is a further object of my invention to provide a thermocouple having a retractable thermal junction so that the thermal junction can be withdrawn into a relatively protected position within the cover assembly when the thermocouple is not in use for determining temperatures.

These and other objects will become more apparent after referring to the following specification and attached drawings in which:

Figure 1 is a front elevational view of the invention;

Figure 2 is an enlarged detail longitudinal sectional view;

Figure 2a is a continuation of Figure 2; and

Figure 3 is a plan view taken on the line III—III of Figure 2a.

Referring more particularly to the drawings, the main body of the cover assembly of the thermocouple of my invention is made up of a metal pipe 2 having a carbon sleeve 4 therearound extending along approximately three-fourths of its length from its forward end 6. The carbon sleeve may be held on the pipe by means of a retaining ring 5 and a compression spring 9. The forward end of the pipe is fitted, by means of a set screw 7, with a bored head 8, which may be made of stainless steel, carbon or other heat-resistant material as preferred. The head 8 is provided with a recess 10 in its forward face for receiving a carbon plug 12 having a center bore 14 therethrough communicating with the bore of the head 8. The rearward end of the head 8 is shaped to form a shoulder 15 which functions as an abutment for the forward end of the carbon sleeve 4 urged thereagainst by the compression spring 9. A hollow quartz immersion housing tube 16 is fitted in the bore 14 of the plug 12 with its closed end 18 projecting from the plug and its open end 20 communicating with the bore of the head 8 and the bore of the pipe 2.

A thermo-electric wire unit 22 made up of wires 22a and 22b of dissimilar rare metals joined at one end to form a thermal junction 24 is disposed within the pipe 2 with the thermal junction 24 projecting from the pipe 2 adjacent its forward end 6. The wires 22a and 22b are covered with a porcelain insulating tube 26. Extension wires 23a and 23b lead from the wires 22a and 22b and are covered with sectional porcelain bead insulators 28. The terminal end portions of the extension wires are formed into an insulated cable 30 which projects from the rearward end of the thermocouple assembly and extends to a connection with an electrical measuring instrument (not shown).

The foregoing construction is conventional and is not claimed as my invention which will now be described in detail.

A tube 32, made preferably of stainless steel, is telescoped within the rearward portion of the pipe 2 surrounding the wires of the thermo-electric circuit with a portion thereof projecting from the rearward end of the pipe. An elongated coupling 34 is clamped on the rearward end 35 of the pipe 2 by means of a screw 36 and projects axially therefrom. The end of tube 32 projecting from the pipe 2 passes through a center bore 38 in the coupling and is clamped therein by means of a set screw 40. The rearward portion of the coupling is provided with an axial slot 42 through its wall which terminates at each end in right angle extensions 44a and 44b, respectively. The purpose of slot 42 will become more apparent as this description proceeds.

A tube 46 is slidably telescoped within tube 32 surrounding the wires and cable of the thermo-electric circuit and projects outwardly of the rearward end of tube 32 to extend through the center bore 38 of the coupling 34 and project outwardly therefrom. Since plain carbon steel tubes used in immersion thermocouples tend to scale due to the extremely high temperatures encountered, tubes 32 and 46 are preferably made of heat resistant stainless steel that does not scale readily at high temperatures so as to prevent binding between the two and also eliminate the possibility of contamination of the rare metal wires by scale flakes or powder that may result from such scale formation.

The tube 46 is supported within the bore 38 of the coupling by means of a clamp 48 made up of an inner ring 50 peripherally fitted snugly on the tube 46 and an outer ring 52 slidably fitted in the bore 38 and superimposed concentrically on the inner ring 50. The inner and outer rings are held together by means of a set screw 54 which projects upwardly from the clamp 48 to fit slidably in the slot 42 and function therewith as a guide lug and stop means to limit the axial movement of the tube 46 as will be more fully described hereinafter.

The extension cable 30 projects outwardly of the rearward end of the tube 46. The cable 30 is connected with the end of the tube 46 by means of a conventional pressure fitting clamp 55, as best shown in Figure 2a. With this arrangement, the thermal junction 24 may be removed axially by moving the tube 46 axially.

A guide tip 56 is fitted into the forward end of the tube 32 with a portion thereof projecting outwardly of the tube. The inner end of the guide tip is flared, as at 57, so as to facilitate insertion of the thermal junction 24 therein while its outer end is tapered to conform with the shape of the bore of the head 8 to permit rapid positioning of the forward end of the tube 32 when the thermocouple is assembled. The guide 56 is maintained in position by means of a set screw 58.

In use, when it is desired to replace the cover assembly of the thermocouple, thermal junction 24 is retracted from the quartz tip 16 to the position shown in solid lines in Figure 2 by grasping the projecting end of the tube 46, rotating it slightly, moving the guide lug 54 out of the terminal extension 44a of slot 42, and then moving the tube 46 axially to the right until the guide lug 54 reaches the rearward end of the slot 42 as shown in Figures 2a and 3. The tube 46 is then rotated again to cause the lug 54 to enter the terminal extension 44b. After the thermal junction has thus been retracted, the cover assembly, including the pipe 2, carbon sleeve 4, the head 8, carbon plug 12 and quartz tip 16, may be removed by loosening screw 36 and slipping the pipe 2 out of the coupling 34. After the cover assembly has been replaced, the thermal junction is advanced to the forward position shown by broken lines in Figure 2 by manipulating the tube 46 as described above but in the reverse manner.

The structural arrangement of my invention thus permits the thermal junction to be easily and quickly retracted into protected position when temperature readings are not being taken so that it is not subject to extensive wear or damage. The interchangeable cover assembly is especially useful in cases where frequent temperature readings must be taken. Since the external cover assembly absorbs considerable heat during one immersion, and this heat transfers to the thermo-electric circuit in a short time, the complete thermocouple must be allowed to cool before each reading is taken or erroneous readings will result. Thus, a number of thermocouples are required where it is desired to take a number of readings at short intervals of time. With the present invention, the overheated cover assembly can be removed and another installed in its place before any appreciable amount of excess heat is transferred to the wires of the thermo-electric circuit. This makes it possible to use one thermo-electric circuit with a number of external cover assemblies where frequent temperature readings must be taken.

Through utilization of independent and interchangeable external cover assemblies and thermo-electric circuits, and a thermal junction that can be retracted into a protected position, the present invention affords considerable advantages over prior art immersion type thermocouples.

While one embodiment of my invention has been shown and described, it will be apparent that other adaptations and modifications may be made without departing from the scope of the following claims.

I claim:

1. In a thermocouple assembly including an elongated casing having a thermal junction housing projecting from one end, a thermo-electric wire unit having a thermal junction at one end and extending through said casing with said thermal junction disposed adjacent said one end of said casing and the other end of said unit projecting from the end of said casing remote from said housing, the improvement therewith of a first tube telescoped within said casing surrounding said thermo-electric wire unit and projecting outwardly of the end of said casing remote from said housing, means mounted on said first tube for removably connecting said casing and said first tube in fixed relation, a second tube slidably telescoped within said first tube surrounding said thermo-electric wire unit and projecting from the end of said first tube remote from said housing, means for slidably supporting the projecting end of said second tube with said first mentioned connecting means, means on the projecting end of said second tube for clamping said thermo-electric wire unit and said second tube together whereby said unit is moved axially to move said thermal junction into and out of said housing when said second tube is moved axially, and means for limiting the axial movement of said second tube.

2. In a thermocouple assembly including a casing having a thermal junction housing projecting from one end, a thermo-electric wire unit having a thermal junction at one end and extending through said casing with said thermal junction disposed adjacent said one end of said casing and the other end of said unit projecting from the end of said casing remote from said housing, the improvement therewith of an elongated coupling having a center bore therethrough removably affixed to the end of said casing opposite its said one end and projecting therefrom with its center bore communicating with the bore of said casing and surrounding said thermo-electric wire unit, a first tube extending axially through said casing and said coupling surrounding said thermo-electric wire unit with one end terminating adjacent said one end of said casing tube and its other end terminating in the bore of said elongated coupling intermediate its ends, said pipe being fixed within said elongated coupling, a second pipe telescoped within said first pipe surrounding said thermo-electric wire unit and projecting outwardly of said coupling, a locking clamp fitted on the projecting end of said second pipe for affixing said cable extension thereto whereby axial movement of said second pipe moves said thermo-electric wire unit axially in said casing tube to thereby move said thermal junction into and out of said thermal junction housing, and stop means on said elongated coupling and said second pipe for limiting the axial movement of the latter.

3. In a thermocouple assembly the improvement as defined by claim 2 characterized by said elongated coupling having an axially directed slot through the wall thereof terminating at each end in substantially right angle extensions, a lug projecting from the outer surface of said second tube fitting in and adapted to travel along said axial slot for limiting the axial movement of said second tube.

4. In a thermocouple assembly the improvement therewith as defined by claim 3 characterized by a guide tip having a center bore and a flared entrance end being fitted by its flared end in the end of said first tube adjacent said junction housing and projecting therefrom to said junction housing for guiding said thermal junction as said thermo-electric wire unit is moved axially.

References Cited in the file of this patent

UNITED STATES PATENTS

| | | |
|---|---|---|
| 1,979,085 | Vollrath | Oct. 30, 1934 |
| 2,463,427 | Richards | Mar. 1, 1949 |
| 2,490,817 | Klingel | Dec. 13, 1949 |
| 2,642,468 | Dodson | June 16, 1953 |
| 2,732,416 | Robertson | Jan. 24, 1956 |